(12) United States Patent
Nelson et al.

(10) Patent No.: US 10,042,374 B2
(45) Date of Patent: Aug. 7, 2018

(54) METHOD AND APPARATUS FOR DETERMINING A WEAKENED GRID CONDITION AND CONTROLLING A POWER PLANT IN A MANNER APPROPRIATE TO THE GRID CONDITION

(71) Applicant: Siemens Aktiengesellschaft, München (DE)

(72) Inventors: Robert J. Nelson, Orlando, FL (US); Najlae M. Yazghi, Orlando, FL (US); Hongtao Ma, Orlando, FL (US); William F. Clark, Oviedo, FL (US)

(73) Assignee: Siemens Gamesa Renewable Energy A/S, Brande (DK)

( * ) Notice: Subject to any disclaimer, the term of this patent is extended or adjusted under 35 U.S.C. 154(b) by 725 days.

(21) Appl. No.: 14/303,877

(22) Filed: Jun. 13, 2014

(65) Prior Publication Data

US 2015/0361954 A1 Dec. 17, 2015

(51) Int. Cl.
*F03D 7/00* (2006.01)
*F03D 9/00* (2016.01)
(Continued)

(52) U.S. Cl.
CPC ............ *G05F 1/66* (2013.01); *F03D 7/0284* (2013.01); *F03D 7/048* (2013.01); *G05B 15/02* (2013.01);
(Continued)

(58) Field of Classification Search
CPC ......... G05F 1/66; G05B 15/02; F03D 7/0284; F03D 7/048; H02J 3/24; H02J 3/383;
(Continued)

(56) References Cited

U.S. PATENT DOCUMENTS 8,615,331 B2   12/2013  Garcia
9,000,734 B2 *  4/2015  Andresen ............... H02P 9/02
                                                      322/23
(Continued)

FOREIGN PATENT DOCUMENTS

CA      2878335 A1 *  1/2014  ............... H02J 3/24
CA      2878409 A1 *  1/2014  ............... F03D 7/04
(Continued)

OTHER PUBLICATIONS

Hau et al., "Reactive Power Control for Parallel Wind Parks Comprising Q(U) Characteristics", Apr. 2012, Fraunhofer Institute for Wind Energy and Energy System Technology, Germany.

*Primary Examiner* — M. N. Von Buhr

(57) ABSTRACT

Method and apparatus are provided for determining a grid condition, such as a weakened grid condition, and controlling a power plant, such as a wind or solar power plant, in a manner which is appropriate to the grid condition. The method includes measuring (14) output parameters of a generator, such as a wind turbine or PV generator. The measured output parameters include reactive power and voltage. The method further includes determining (16) a relationship between the measured output parameters of the generator. The relationship between the measured output parameters of the generator is indicative of a condition of a power grid to which the plant supplies power. The method allows controlling (18) the plant responsive to the relationship between the measured output parameters of the generator to avoid onset of oscillatory behavior, which could otherwise occur in the power plant in the presence of a weakened grid condition.

17 Claims, 3 Drawing Sheets

(51) Int. Cl.
  *G05B 15/02* (2006.01)
  *G05F 1/66* (2006.01)
  *F03D 7/02* (2006.01)
  *F03D 7/04* (2006.01)
  *H02J 3/24* (2006.01)
  *H02J 3/38* (2006.01)

(52) U.S. Cl.
  CPC ............... *H02J 3/24* (2013.01); *H02J 3/383* (2013.01); *H02J 3/386* (2013.01); *Y02E 10/563* (2013.01); *Y02E 10/723* (2013.01); *Y02E 10/763* (2013.01)

(58) Field of Classification Search
  CPC ...... H02J 3/386; Y02E 10/763; Y02E 10/563; Y02E 10/723
  See application file for complete search history.

(56) References Cited

U.S. PATENT DOCUMENTS

| | | | |
|---|---|---|---|
| 9,190,845 B2* | 11/2015 | Nelson | H02J 3/386 |
| 9,243,613 B2* | 1/2016 | Yin | F03D 7/028 |
| 9,541,062 B2* | 1/2017 | Yin | F03D 7/0284 |
| 9,541,063 B2* | 1/2017 | Yin | G05B 13/021 |
| 9,556,853 B2* | 1/2017 | Gupta | H02J 3/16 |
| 2011/0190958 A1* | 8/2011 | Hirst | H02J 3/14 700/295 |
| 2012/0067965 A1* | 3/2012 | Rajasekaran | B64F 1/362 236/44 C |
| 2012/0076287 A1* | 3/2012 | Ramalingam | H04B 3/23 379/202.01 |
| 2012/0186283 A1* | 7/2012 | Giunta | F25B 49/025 62/115 |
| 2013/0015660 A1 | 1/2013 | Hesselbaek et al. | |
| 2013/0033234 A1* | 2/2013 | Koritarov | H02J 7/04 320/137 |
| 2013/0119660 A1* | 5/2013 | Yasugi | H02P 9/04 290/44 |
| 2013/0205814 A1* | 8/2013 | Hayashida | F24H 4/04 62/115 |
| 2013/0234634 A1* | 9/2013 | Hofer | H02P 6/14 318/400.09 |
| 2013/0272844 A1* | 10/2013 | Lobato Pena | H02J 3/386 415/1 |
| 2013/0300118 A1 | 11/2013 | Bech | |
| 2014/0021720 A1 | 1/2014 | Nelson et al. | |
| 2014/0107607 A1* | 4/2014 | Estes | A61M 5/1452 604/500 |
| 2014/0232357 A1* | 8/2014 | Huomo | H02J 3/1892 323/205 |
| 2015/0137520 A1* | 5/2015 | Garcia | H02J 3/1885 290/44 |
| 2015/0148974 A1* | 5/2015 | Diedrichs | H02J 3/16 700/287 |
| 2015/0198145 A1* | 7/2015 | Diedrichs | F03D 7/04 700/287 |
| 2015/0249414 A1* | 9/2015 | Barker | H02P 9/007 290/44 |
| 2015/0280629 A1* | 10/2015 | Diedrichs | H02J 3/24 290/44 |
| 2015/0349528 A1* | 12/2015 | Wang | H02J 3/386 307/52 |
| 2015/0357818 A1* | 12/2015 | Wang | H02J 3/38 307/52 |
| 2016/0241154 A1* | 8/2016 | Donescu | H02M 5/458 |

FOREIGN PATENT DOCUMENTS

| | | | | |
|---|---|---|---|---|
| CA | 2878993 A1 * | 1/2014 | | H02J 3/16 |
| CN | 102301556 A | 12/2011 | | |
| CN | 103208803 A | 7/2013 | | |
| CN | 103541860 A | 1/2014 | | |
| EP | 2605356 A1 | 6/2013 | | |
| EP | 2711543 A1 | 3/2014 | | |
| WO | 2011050807 A2 | 5/2011 | | |
| WO | 2014082642 A1 | 6/2014 | | |
| WO | WO 2014124644 A1 * | 8/2014 | | H02J 3/16 |
| WO | WO 2014169706 A1 * | 10/2014 | | H02J 3/386 |
| WO | WO 2014169709 A1 * | 10/2014 | | H02J 3/16 |

* cited by examiner

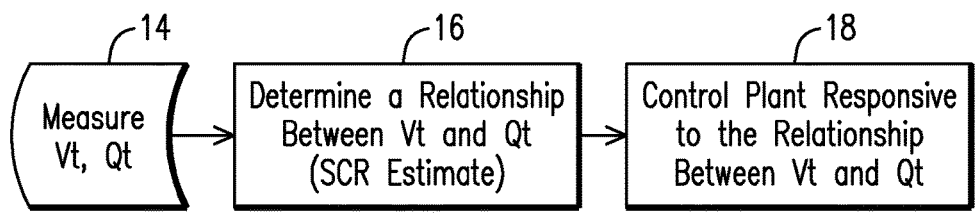
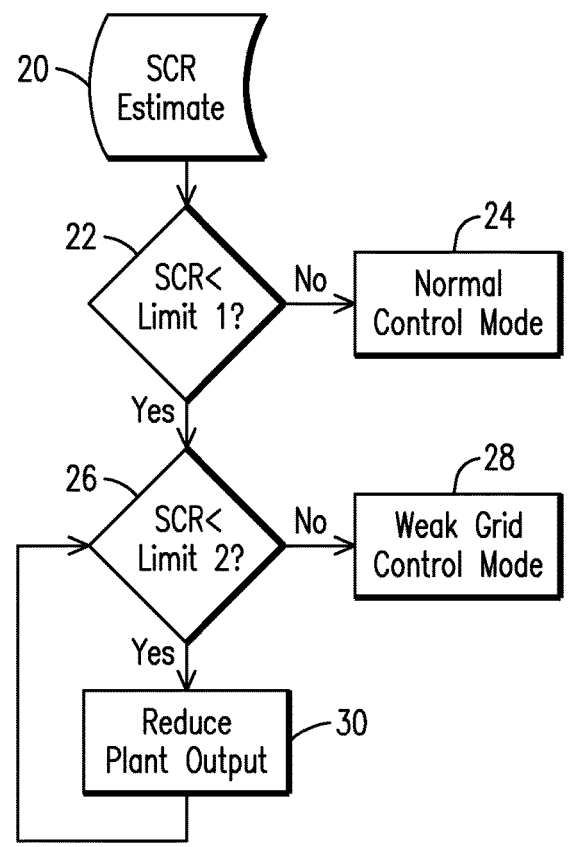

METHOD AND APPARATUS FOR DETERMINING A WEAKENED GRID CONDITION AND CONTROLLING A POWER PLANT IN A MANNER APPROPRIATE TO THE GRID CONDITION

FIELD OF THE INVENTION

The invention relates generally to control of power generation plants, and, more particularly, to a method and apparatus for determining a grid condition, such as a weakened grid condition, and controlling a power plant, such as a wind power plant or a solar plant, in a manner which is appropriate to the grid condition.

BACKGROUND OF THE INVENTION

Wind turbines use naturally-available wind energy to generate electrical power in an environmentally-friendly manner. Wind turbine plants and other forms of renewable power generation connected to provide electrical power to a power grid can be susceptible to so called "weak-grid" conditions. U.S. patent application Ser. No. 13/550,699, United States patent application publication number US 2014/0021720 A1, commonly assigned to the assignee of the present invention and incorporated by reference herein, describes use of a technique for controlling a power generation system, such as involving a wind power plant, where the control technique involves injection of reactive power into the system.

BRIEF DESCRIPTION OF THE DRAWINGS

The invention is explained in the following description in view of the drawings that show:

FIG. 2 is a flow chart of a method embodying aspects of the present invention.

FIG. 3 is a flow chart illustrating further details of a method embodying aspects of the present invention.

DETAILED DESCRIPTION OF THE INVENTION

Figure 1:
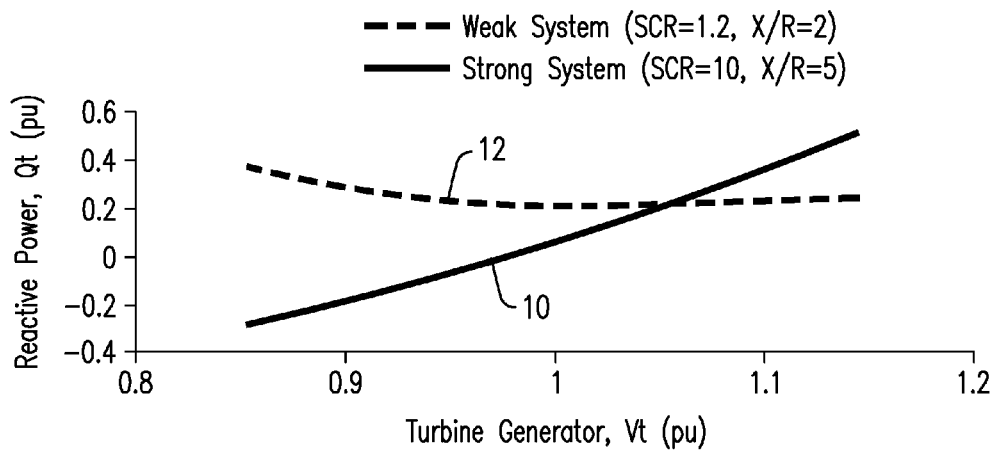
FIG. 1 illustrates respective graphs for comparing respective example responses of reactive power Qt as a function of wind turbine generator voltage Vt in a strong system versus a weakened system.

A power plant, such as may involve a wind turbine and/or a solar photovoltaic (PV) power plant, connected to provide electrical power to a power grid can be susceptible to weakened grid conditions. These conditions may occur without a priori knowledge of the plant operator. One example application below is described in terms of a wind plant; it will be appreciated however, that other forms of renewable power generation and energy storage, such as involving power control devices implementing phase locked loop control, can also benefit from aspects of the present invention. Accordingly, description of embodiments of the invention in the context of a wind power plant should be construed in an example sense and not in a limiting sense.

Short circuit "strength" is a measure of the ability of a system to provide short circuit current when a short circuit occurs in the system. Systems that provide high levels of short circuit current are generally described as "strong", while systems that provide low levels of short circuit current are generally described as "weak". The short circuit "strength" is typically described in terms of "Short Circuit VA", where, for an n-phase system, $$\text{Short Circuit } VA = n \times Isc \times Vln$$

Where:
n=number of phases (n=3 for typical power system applications)
Isc=balanced short circuit current per phase, rms Amperes
Vln=line-to-neutral voltage, rms Volts
For example, a 3-phase 69 kV (line-to-line) (roughly 40 kv line to neutral) system with a balanced 3-phase short circuit current of 10 kA per phase, would be said to have a short circuit strength of roughly 400 MVA.

A generating system's capability can be compared to the available short circuit strength to determine the compatibility of the generating plant with the system. Generally, a generating plant's capability should be considerably less than the short circuit strength of the connected system.

A general rule of thumb is that a converter based generating plant, such as a wind plant or a solar plant, should have a generating capacity which is less than approximately ¼ of the short circuit strength of the system. The reciprocal of this ratio is the "Short Circuit Ratio (SCR)", which is generally defined as the short circuit strength of the system divided by the plant power capacity. Generally, a plant connected to a system with a short circuit strength of less than 4 times the plant generating capacity (i.e., an SCR approximately less than 4) is said to have a weak system connection. For the example of the aforementioned system with a short circuit strength of 400 MVA, if a 40 MW wind plant or solar plant were connected to it, the system would be said to have a "short circuit ratio" of 10. If the plant had a capacity of 200 MW, the system would be said to have a "short circuit ratio" of 2. A system designated as a "strong" system in comparison to the generating plant will typically have a short circuit ratio of approximately 10 or higher.

A system designated as a "weak" system in comparison to the generating plant will typically have a short circuit ratio of 4 or less. SCR is a convenient indicator of system impedance, since the SCR is inversely proportional to the system impedance. Conceptually, it may be relatively straightforward to determine the SCR at any point in a power transmission system under idealized system operation (e.g., all generators and transmission lines are in service). However, under real-world operating conditions, when one or more of transmission lines and/or one or more of the generators may be taken out of service during normal operation of the system, the actual operating SCR may be considerably lower than the ideal value because removing lines or synchronous generators reduces short circuit availability, as well as the ability of the local system to regulate voltage and provide synchronizing torque to maintain system transient stability.

It will be appreciated that without knowledge of the actual operating SCR under such real-world operating conditions, regulation of the power quality supplied to such a system can be challenging. It is quite possible, for example, that a local generating plant or high-capacity transmission may be taken out of service for several months at a time, so that a normally strong system is placed in a weakened state for an extended period. Normally, the wind plant operator would have no way to determine, from routine observations of the power system that such a weakened condition exists.

At low SCR values (e.g., presently typically below approximately 4.0), a converter-based wind or solar PV power plant can be affected by oscillatory instability. In some cases, the output power of the plant may need to be curtailed, and, in some cases, the plant may even have to be taken offline to avoid such instabilities, which can have negative effects on the power grid.

Since the power plant operator generally has no knowledge of the actual short circuit strength availability, it becomes substantially difficulty to discern whether a weakened grid condition presently exists and much less to predict when the weakened grid condition may occur in the future.

As will be appreciated by those skilled in the art, the short circuit availability is predominantly a function of the status of interconnecting transmission lines and/or local power generation. Knowing whether one or more local generators and/or one or more transmission lines may be out of service would be valuable information to the wind power plant operator; however, in a real-world utility grid operation, the wind power plant operators are not likely to have such information available at their disposal. Consequently, wind plant operators are often unaware of actual grid conditions until it becomes too late (e.g., oscillations, resulting in a trip, occur). The basic fact remains that sooner or later most wind or solar power plants are likely to encounter weak-grid conditions.

The present inventors have cleverly recognized a pertinent characteristic in certain renewable energy power plants, such as wind or solar PV power plants. Namely, that in the presence of a weakened grid condition, generators can lose much of their ability to control reactive power output. As will be appreciated from the discussion of FIG. 1 below, as a generator voltage varies, reactive power does not increase as steep as it does in a strong system.

FIG. 1 illustrates respective graphs for comparing respective example responses of output parameters of a wind turbine generator [namely reactive power Qt and voltage Vt] that can be effectively used to assess a condition of a power grid to which the wind power plant supplies power. These graphs illustrate reactive power Qt as a function of voltage Vt in a strong system versus a weak system. More specifically, graph 10 illustrates an example response of Qt as a function of Vt in a strong system. In this example scenario, as the turbine generator voltage (e.g., generator terminal voltage) increases, the reactive power output increases with a positive slope. Conversely, graph 12 conceptualizes an example response of Qt as a function of Vt in a weak system. In this example scenario, reactive power no longer changes in a roughly linear fashion, as it does for a strong system.

Based on such a clever recognition, the present inventors propose utilization of such a characteristic to recognize whether the wind plant is operating under a weakened grid condition so that a controller may be adapted to take an appropriate control action to maintain an appropriate level of power regulation, e.g., avoid an onset of oscillatory behavior.

FIG. 2 is a flow chart of a method embodying aspects of the present invention. In one non-limiting embodiment, step 14 allows measuring output parameters of at least one selected generator, such as one or more wind turbine generators, one or more solar PV generators, etc., comprising reactive power Qt and voltage Vt. Step 14 is performed over a time horizon (e.g., comprising a few minutes) during which a varying output occurs in the selected wind turbine generator. The selected wind turbine generator may be part of a wind power plant comprising a plurality of wind turbine generators. Step 16 allows determining a relationship between the measured output parameters Qt, Vt of the selected wind turbine generator. The relationship between the measured output parameters of the selected wind turbine generator is indicative of a condition of the power grid to which the wind power plant supplies power.

In one non-limiting embodiment, the relationship between the measured output parameters Qt, Vt may be characterized by the slope defined by such parameters. Numerical analysis techniques well understood by those skilled in the art, such as state estimation, regression analysis, least squares fit, etc., may be used to determine the slope defined by parameters Qt, Vt.

In one non-limiting embodiment, the relationship between the measured output parameters Qt, Vt of the selected wind turbine generator is effective to estimate a short circuit ratio (SCR) of the power grid. Step 18 allows controlling the wind power plant in a manner responsive to the relationship between the measured output parameters of the wind turbine generator.

In one non-limiting embodiment, the varying output may occur in response to a natural variation in the output of the wind turbine generator, such as due to a natural variation in wind speed. In another non-limiting embodiment, the varying output may occur in response to a commanded variation in the output of the wind turbine generator. For example, one can vary the turbine generator voltage Vt from a first voltage value to a second voltage value, such as from approximately 98% of a rated value to approximately 102% of the rated value; or alternatively one can vary the turbine generator reactive power Qt from a first VAR level to a second VAR level, etc., while keeping the voltage level at the plant interface to the grid practically constant.

FIG. 3 is a flow chart illustrating further non-limiting aspects of a method embodying aspects of the present invention. In one non-limiting embodiment, step 20 presumes an SCR estimate has been estimated based on the relationship (e.g., slope characteristics, etc.) between the measured output parameters Qt, Vt of the wind turbine generator. More generally, the SCR estimate may comprise a numerical value or qualitative classification of the short circuit strength for the power grid based on the relationship between the measured output parameters Qt, Vt of the wind turbine generator. For example, a plant controller for the wind plant may be adjusted responsive to that numerical value or qualitative classification to avoid an onset of oscillatory behavior.

In one non-limiting embodiment, step 22 allows comparing the SCR estimate relative to a first predefined limit (Limit1). If the SCR estimate is above Limit1, the plant controller may be set to operate in a normal control mode, as represented by block 24. If the SCR estimate is below Limit1, as represented by block 26, a further comparing of the SCR estimate may be made relative to a second predefined limit (Limit2), which is lower than Limit1.

If the SCR estimate is above Limit2, then the plant controller may be set to operate in a weak grid control mode, as represented by block 28. This may comprise adjusting control parameters, such as gains, time delays, and other parameters in a plant control algorithm to optimize performance of plant voltage regulation and power control of the wind plant. If the SCR estimate is below Limit2, then the wind plant may be commanded to reduce plant output, as represented by block 30. It will be appreciated that the embodiment above which is described in terms of comparing SCR estimates relative to respective predefined limits should be construed in an example sense and not in a limiting sense. For example, it is contemplated that the decision for selecting the appropriate control mode could be made in terms of a comparison of the slope obtained from the measured parameters relative to predefined slope ranges.

It will be appreciated that the adjustment of the control parameters in block 24 need not be implemented in binary fashion and may be selected to achieve a desired degree of control granularity according to different predetermined ranges of estimated SCR values. For example, a first parameter adjustment suite may be used for an SCR estimate between 3 and 4 and a second parameter adjustment suite may be used for an SCR estimate between 2 and 3. In one non-limiting embodiment, the suite of parameters to be adjusted and the amount of parameter adjustment for different SCR estimates can be predefined and stored in a memory and then retrieved to be put into operation as required based on the SCR estimates.

Figure 4:
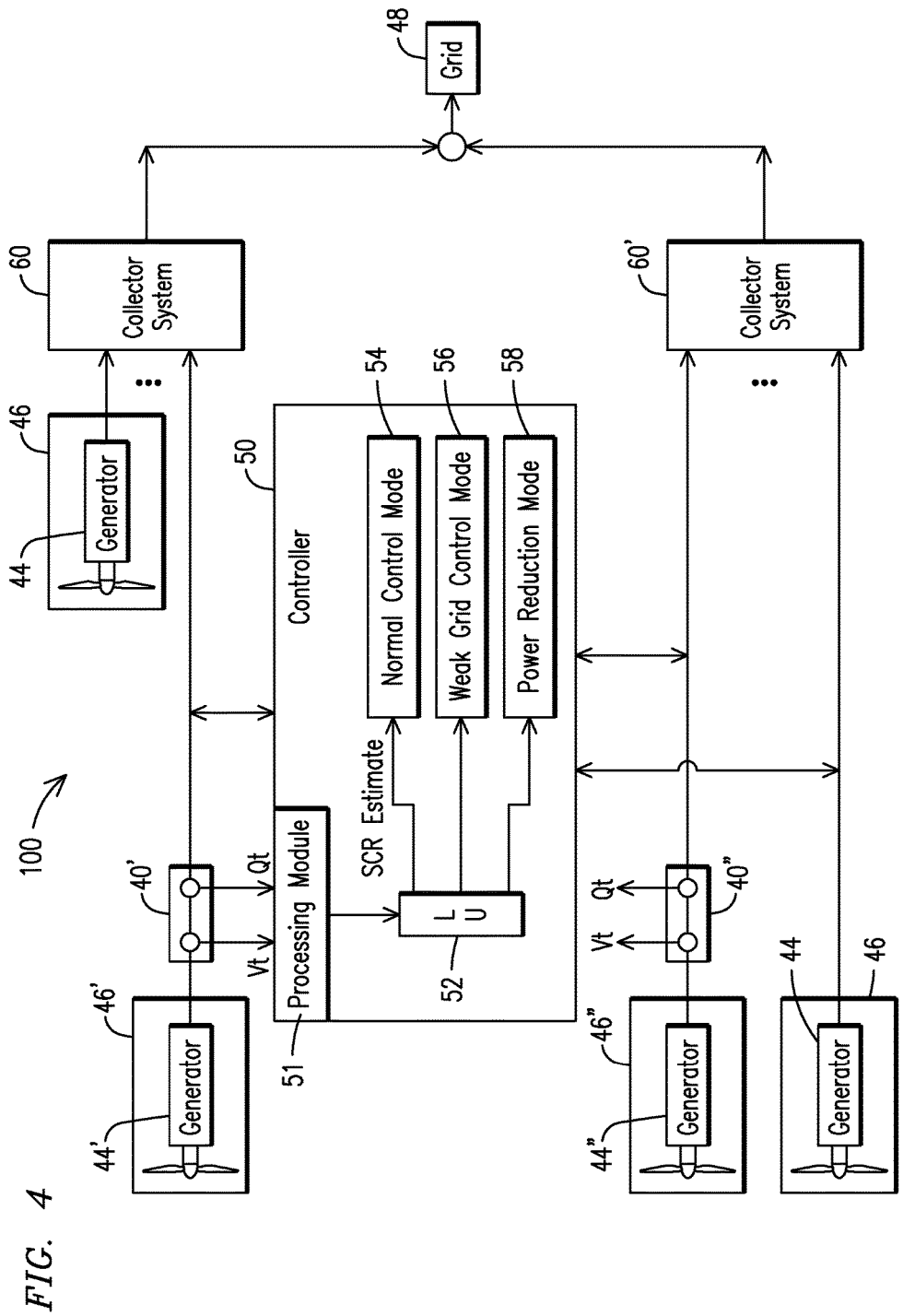
FIG. 4 is a block diagram of an apparatus including a controller for controlling a wind turbine in accordance with aspects of the present invention.

FIG. 4 is a schematic representation of a power plant that may be benefit from an apparatus embodying aspects of the present invention. In one example embodiment, a measuring device 40' is coupled to a wind turbine generator 44' in a wind turbine 46' in a power plant 100 comprising a plurality of wind turbines 46 including respective wind turbine generators 44.

In one non-limiting embodiment, over a time horizon when a varying output occurs in wind turbine generator 44', measuring device 40' is arranged to measure output parameters of wind turbine generator 44' comprising reactive power Qt and voltage Vt. A processing module 51 is configured to determine a relationship between the measured output parameters Qt, Vt of wind turbine generator 44'. The relationship between the measured output parameters of the wind turbine generator is indicative of a condition of a power grid 48 to which wind power plant 100 supplies power.

In one non-limiting embodiment, the relationship between the measured output parameters Qt, Vt of the wind turbine generator is effective to estimate a short circuit ratio (SCR) of power grid 48. A controller 50 is configured to control the wind turbine power plant in a manner responsive to the relationship between the measured output parameters of the wind turbine generator, such as described above in the context of FIGS. 1-3. For example, a logic unit (labeled L U) 52 in controller 50 may be responsive to a magnitude of the estimated SCR so as to select a control mode appropriate to the grid condition. Non-limiting examples may be a normal control mode 54, a weak grid control mode 56 and a power reduction mode 58 as described above in the context of FIG. 3.

In one non-limiting embodiment, wind turbine plant 100 may comprise a plurality of collector systems 60, 60' being fed by different sets of wind turbine generators. In one non-limiting embodiment, the steps of measuring 14 and determining 16 (FIG. 2) may be independently performed in at least one of the wind turbine generators in the respective different sets of the wind turbine generators feeding the plurality of collector systems 60 and 62'. For example, wind turbine generator 44" may be one of the generators in the set of generators connected to collector system 60'. In this example, a measurement device 40" may be arranged to measure output parameters of wind turbine generator 44" comprising reactive power Qt and voltage Vt. These measured parameters may be processed by processing module 51 to, for example, calculate an independent estimate for the SCR of the power grid. For example, if the SCR estimates obtained from such independent measurements agree, this would tend to statistically corroborate the assessment of the power grid condition. Conversely, if the SCR estimates obtained from such independent measurements do not agree, this may indicate that some local condition, (for example a circuit breaker associated with one of the collector systems may have been tripped) could be affecting the assessment of the power grid condition. It will be appreciated that the foregoing example should be construed in an example sense and not in a limiting sense. For example, the plant operator has the flexibility to implement a method embodying aspect of the present invention in any selected subsets of the wind turbines. Additionally, although FIG. 4 illustrates processing module 51 as part of controller 50, it will be appreciated that such a processing module need not be part of controller 50.

In operation, compared to prior art techniques which involve injection of reactive power into the system, such as may involve injection of pulses comprising reactive power, and which pulses may be observable in the grid, the proposed technique involving a relatively slow variation in the varying output of a wind turbine generator is advantageously non-observable to the power grid. For example, such a variation can be effectively removed (e.g., compensated) by appropriate control of other wind turbine generators in the wind plant.

Figure 5:
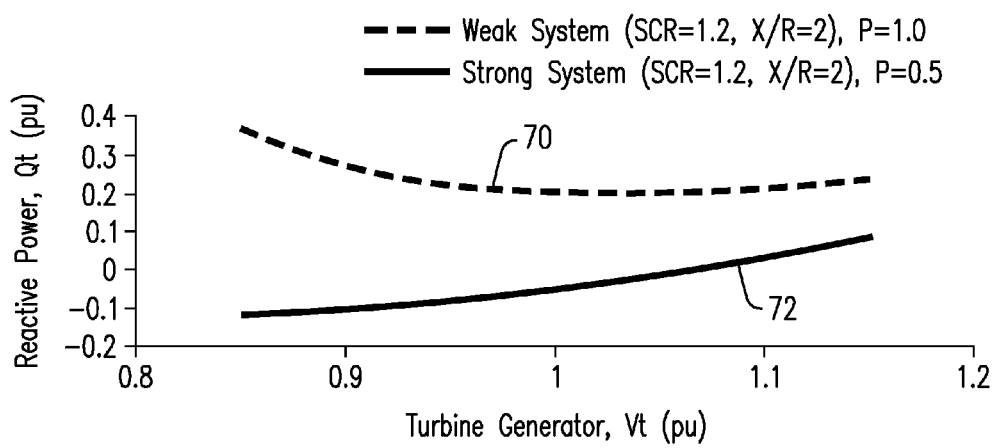
FIG. 5 is a plot illustrating respective graphs for comparing respective example responses of output parameters of a wind turbine generator. One of the graphs indicates a weakened system condition, and, then the output power of a wind plant is adjusted in accordance with aspects of the present invention so that effects of the weakened system condition are practically eliminated, as indicated in the other graph.

FIG. 5 is a plot illustrating respective graphs, one of which (graph 70) corresponds to a weakened system condition, and, where the output power of a wind plant is adjusted in accordance with aspects of the present invention (e.g., reduced by 50%) so that the effects of the weakened system condition are practically eliminated, as can be appreciated by the response of Qt to changes in Vt shown in graph 72, (e.g., positive slope with a higher degree of linearity) compared to the response shown in graph 70.

While various embodiments of the present invention have been shown and described herein, it will be apparent that such embodiments are provided by way of example only. Numerous variations, changes and substitutions may be made without departing from the invention herein. Accordingly, it is intended that the invention be limited only by the spirit and scope of the appended claims.

The invention claimed is:

1. A method comprising:
over a time horizon during which a varying output occurs in at least one selected wind turbine generator in a wind power plant comprising a plurality of wind turbine generators, measuring output parameters of the at least one selected wind turbine generator comprising reactive power and voltage;
determining a relationship between the measured output parameters of the at least one selected wind turbine generator, the relationship between the measured output parameters of the at least one selected wind turbine generator being indicative of a condition of a power grid to which the wind power plant supplies power;
controlling the wind power plant in a manner responsive to the relationship between the measured output parameters of the at least one selected wind turbine generator;
wherein the relationship between the measured output parameters of the at least one selected wind turbine generator is effective to estimate a short circuit ratio in the power grid; and
wherein the controlling of the wind power plant comprises selecting a predefined normal control mode in a controller for the wind power plant when the estimate of the short circuit ratio is above a predefined first limit, selecting a predefined weak grid control mode in the controller for the wind power plant when the estimate of the short circuit ratio is below the predefined first limit and above a predefined second limit, and reducing output of the wind power plant when the estimate of the short circuit ratio is below the predefined second limit.

2. The method of claim 1, wherein the varying output occurs in response to a natural variation in the output of the at least one selected wind turbine generator.

3. The method of claim 1, wherein the varying output occurs in response to a commanded variation in the output of the at least one selected wind turbine generator.

4. The method of claim 1, wherein the relationship between the measured output parameters of the at least one selected wind turbine generator is based on a response over the time horizon of the reactive power to changes in the voltage, or is based on a response over the time horizon of the voltage to changes in the reactive power.

5. The method of claim 1, wherein the relationship between the measured output parameters of the at least one selected wind turbine generator is characterized by a slope defined by said parameters.

6. The method of claim 1, wherein the controlling of the wind power plant comprises reducing the output of the wind power plant when the estimate of the short circuit ratio is below the predefined second limit, but not when it is above the predefined second limit.

7. The method of claim 1, wherein a response of the measured output parameters of the at least one selected wind turbine generator during the varying output in the selected wind turbine generator is compensated for by control of other wind turbine generators in the wind plant.

8. The method of claim 1, wherein the wind turbine plant comprises a plurality of collector systems being fed by respective different sets of wind turbine generators, wherein the steps of measuring and determining are performed in at least one of the wind turbine generators in the respective different sets of the wind turbine generators feeding the plurality of collector systems.

9. The method of claim 1, wherein the predefined normal control mode differs from the predefined weak grid control mode in at least one of a gain and a time delay of a plant control algorithm.

10. A method comprising:
over a time horizon during which a varying output occurs in at least one selected generator of a power plant, measuring output parameters of the at least one selected generator comprising reactive power and voltage;
determining a relationship between the measured output parameters of the at least one selected generator, the relationship between the measured output parameters of the at least one selected generator being indicative of a condition of a power grid to which the power plant supplies power; and
selecting a predefined normal control mode in a controller for the wind power plant when the relationship is above a predefined first limit, selecting a predefined weak grid control mode in the controller for the wind power plant when the relationship is below the predefined first limit and above a predefined second limit, and reducing output of the wind power plant when the relationship is below the predefined second limit.

11. The method of claim 10, wherein the at least one selected generator comprises a wind turbine generator and the varying output occurs in response to a natural variation in the wind turbine generator output, or in response to a commanded variation in the wind turbine generator output.

12. The method of claim 10, wherein the at least one selected generator comprises a solar photovoltaic generator and the varying output occurs in response to a natural variation in the solar photovoltaic generator output, or in response to a commanded variation in the solar photovoltaic generator output.

13. The method of claim 10, wherein the relationship between the measured generator output parameters is based on a response over the time horizon of the reactive power to changes in the generator voltage over the time horizon, or is based on a response over the time horizon of the generator voltage to changes in the reactive power.

14. An apparatus comprising:
a measuring device coupled to at least one selected generator in a power plant, wherein over a time horizon when a varying output occurs in the at least one selected generator, the measuring device is arranged to measure output parameters of the at least one selected generator comprising reactive power and voltage;
a processing module configured to determine a relationship between the measured output parameters of the at least one selected generator, the relationship between the measured output parameters of the at least one selected generator being indicative of a condition of a power grid to which the power plant supplies power; and
a controller configured to control the power plant in a manner responsive to the relationship between the measured output parameters of the at least one selected generator, wherein the relationship between the measured output parameters of the at least one selected generator is effective to estimate a short circuit ratio in the power grid, wherein the controller is configured to control the power plant in a predefined normal control mode when the short circuit ratio is above a predefined first limit, in a predefined weak grid control mode when the short circuit ratio is below the predefined first limit and above a predefined second limit, and to reduce output of the wind power plant when the short circuit ratio is below the predefined second limit;
wherein the predefined normal control mode differs from the predefined weak grid control mode in at least one of a gain and a time delay of a plant control algorithm.

15. The apparatus of claim 14, further comprising a logic unit responsive to the relationship determined between the measured output parameters of the at least one selected generator to select a control mode appropriate to the grid condition.

16. A wind turbine power plant comprising the apparatus of claim 14.

17. A solar photovoltaic power plant comprising the apparatus of claim 14.

* * * * *